(12) United States Patent
Panayides et al.

(10) Patent No.: US 6,401,398 B1
(45) Date of Patent: Jun. 11, 2002

(54) SEALING ARRANGEMENTS

(75) Inventors: Nick Andrew Panayides, Norton Sub Hamdon; Richard Leslie Carter, Yeovil, both of (GB)

(73) Assignee: GKN Westland Helicopters Limited, Yeovil (GB)

( * ) Notice: Subject to any disclaimer, the term of this patent is extended or adjusted under 35 U.S.C. 154(b) by 0 days.

(21) Appl. No.: 09/713,244

(22) Filed: Nov. 16, 2000

(30) Foreign Application Priority Data

Nov. 17, 1999 (GB) ............................................. 9927043

(51) Int. Cl.$^7$ ................................................. E06B 7/22
(52) U.S. Cl. ....................................................... 49/498.1
(58) Field of Search ............................ 49/498.1, 475.1, 49/483.1, 495.1

(56) References Cited

U.S. PATENT DOCUMENTS

| | | | | | |
|---|---|---|---|---|---|
| 2,530,160 | A | * | 11/1950 | Finley | 49/483.1 |
| 2,686,343 | A | | 8/1954 | Harpoothian et al. | |
| 2,910,209 | A | * | 10/1959 | Nelson | 49/498.1 |
| 3,037,251 | A | * | 6/1962 | Landis | 49/498.1 |
| 3,178,779 | A | | 4/1965 | Clark et al. | |
| 3,226,780 | A | * | 1/1966 | Landis | 49/498.1 |
| 3,371,445 | A | * | 3/1968 | Her et al. | 49/483.1 |
| 3,763,595 | A | * | 10/1973 | Sudyk | 49/498.1 |
| 4,010,573 | A | * | 3/1977 | Andrzejewski | 49/498.1 |
| 4,255,903 | A | * | 3/1981 | Reynolds et al. | 49/498.1 |
| 4,987,705 | A | * | 1/1991 | Sampson et al. | 49/483.1 |
| 5,581,951 | A | | 12/1996 | Ryan et al. | |
| 6,116,615 | A | * | 9/2000 | Trehan | 49/498.1 |

FOREIGN PATENT DOCUMENTS

| | | |
|---|---|---|
| DE | 44 02 604 C | 6/1995 |
| EP | 516 526 A1 | 12/1992 |
| GB | 1128627 | 9/1968 |
| GB | 1258563 | 12/1971 |
| GB | 1232358 A | 5/1972 |

* cited by examiner

*Primary Examiner*—Jerry Redman
(74) *Attorney, Agent, or Firm*—Larson & Taylor, PLC

(57) ABSTRACT

A sealing arrangement between an opening leaf and a frame, one of the frame and leaf providing an elongate recess, and the other of the leaf and frame carrying an elongate seal which, when the leaf is closed with respect to the frame, is received in the recess, wherein the elongate seal includes a plurality of axially extending outwardly projecting formations, and an internal hollow, the recess and the seal being configured such that as the leaf is closed and the seal is received in the recess, a first of the axially extending outwardly projecting formations of the seal engages with a respective first part of an inside surface of the recess and as the leaf is continued to be closed, the seal becomes deformed in a manner to cause the or at least one of the other axially extending outwardly projecting formations to be urged into sealing engagement with a second part of the inside surface of the recess.

14 Claims, 6 Drawing Sheets

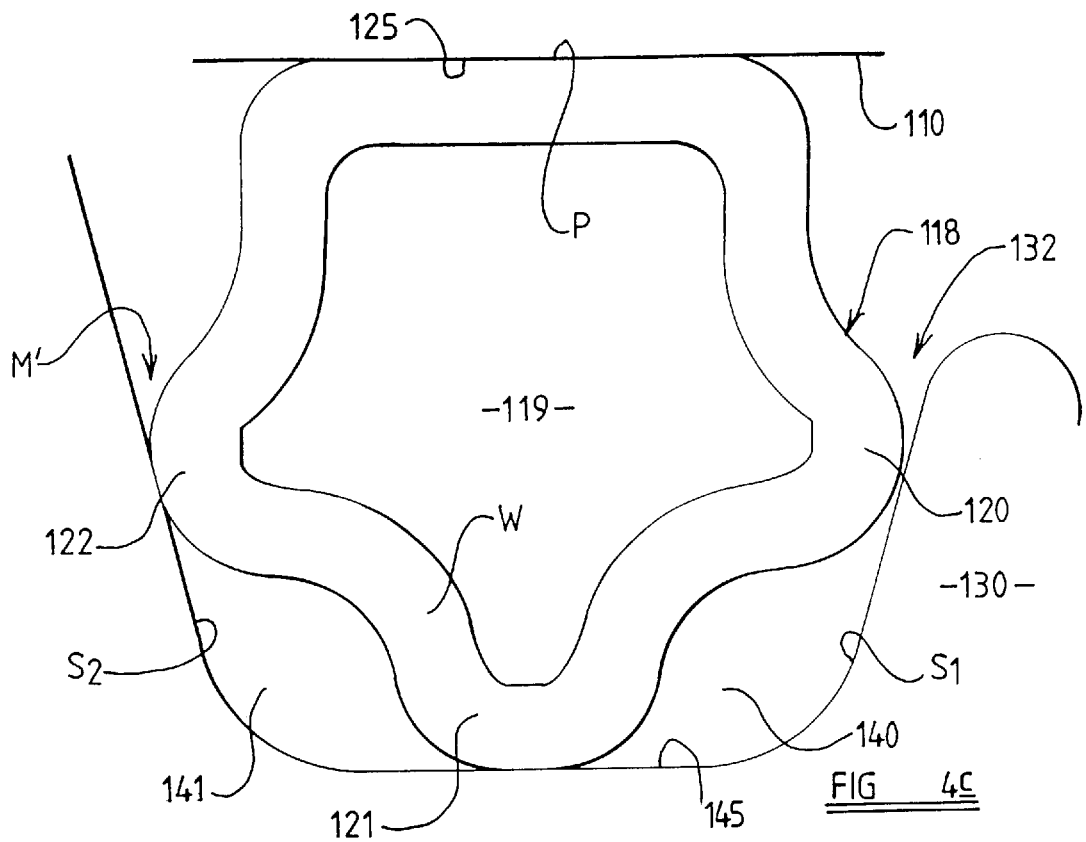

SEALING ARRANGEMENTS

BACKGROUND TO THE INVENTION

This invention relates to a sealing arrangement and more particularly but not exclusively to a sealing assembly for sealing a door in a aircraft fuselage, such as a helicopter fuselage, relative to a door frame or coaming.

DESCRIPTION OF THE PRIOR ART

Particular problems are encountered in providing weatherproof sealing arrangements for doors of helicopter fuselages. First, vibration, particularly in flight, assists water migration between sealed faces. Second, helicopter doors are often made of materials which are able to flex under load, such as resin fibre glass composite materials, and such flexing can allow water to migrate past door seals. Third whereas it is known to provide a weathertight door sealing arrangement by the use of pressurised air to inflate a pressurised seal, such pneumatics are unavailable in a helicopter. Fourth, helicopter cabins tend to be un-pressurised and so again a pressure differential cannot advantageously be used to achieve more effective sealing. Fifth, aerodynamic suction on the door tends to be experienced in flight, resulting in doors being pulled outwardly, again compromising any door sealing arrangement.

Door sealing arrangements for particular use in a helicopter are known which include a substantially "D" shaped seal. Referring to FIG. 1, in such a known sealing arrangement, a "D" shaped seal 12 is provided with a flat surface 13 thereof attached to a helicopter door 10, with a rounded seal part 14 received in a two sided recess 15 in the door coaming 16, when the door 10 is closed. In such an arrangement a single contact area is thus provided between the rounded seal part 14 and the surface of the recess 15 and the seal operates purely to try and prevent the ingress of water past the mating surfaces, there being nothing other than the resilience of the seal 12 to prevent the seal 12 separating from the coaming 16 in response to vibration and aerodynamic suction loads, and door 10 flexing.

SUMMARY OF THE INVENTION

According to one aspect of the invention we provide a sealing arrangement between an opening leaf and a frame, one of the frame and leaf providing an elongate recess, and the other of the leaf and frame carrying an elongate seal which, when the leaf is closed with respect to the frame, is received in the recess, characterised in that the elongate seal includes a plurality of axially extending outwardly projecting formations, and an internal hollow, the recess and the seal being configured such that as the leaf is closed and the seal is received in the recess, a first of the axially extending outwardly projecting formations of the seal engages with a respective first part of an inside surface of the recess and as the leaf is continued to be closed, the seal becomes deformed in a manner to cause the or at least one of the other axially extending outwardly projecting formations to be urged into sealing engagement with as second part of the inside surface of the recess.

By virtue of the invention, an improved more efficient seal particularly but not exclusively for use for sealing a leaf which is a door of an aircraft, with respect to a frame such as a coaming, is provided.

Preferably the seal is of a generally tubular construction having an internal axially extending hollow defined by a tube wall, the hollow in cross section, generally conforming to the external configuration of the seal. The tube wall may be shaped to conform generally to the external configuration of the seal, the tube wall and hence the configuration of the internal hollow deforming as the leaf is closed with respect to the frame.

In a preferred arrangement the seal includes at least three axially extending outwardly projecting formations each arranged to engage with a respective part of the inside surface of the recess as the leaf is closed with respect to the frame, the first axially extending formation being located intermediate a pair of other axially extending formations, and the first axially extending outwardly extending formation engaging with the first part of the inside surface of the recess thus to cause deformation of the seal as the leaf is continued to be closed, such as to urge the pair of other axially extending outwardly extending formations mutually away from one another into sealing engagement with respective parts of the inside surface of the recess.

The seal may have an axially extending generally plain surface part by means of which the seal is attached to the leaf or the frame, with the first outwardly projecting formation extending generally normally to the plain surface part, and the other outwardly projecting formations being located either side of the first formation, and extending outwardly along a line which is generally parallel with the generally plain surface part.

Conveniently, the elongate recess of one of the leaf and frame, is generally channel shaped and has a mouth which, when the leaf is closed in the frame, faces the other of the frame and the leaf respectively, with the outwardly projecting formations of the seal each being in sealing engagement with the inside surface of the channel when the leaf is closed with respect to the frame.

The first inside surface part of the channel with which the first axially extending outwardly projecting formation engages as the leaf is closed with respect to the frame, may thus be at a base of the channel, the other axially extending outwardly projecting formations being urged as the seal deforms, into sealing engagement with respective inside surface parts which are provided at sides of the channel.

By virtue of the provision of axially extending outwardly projecting formations which are urged into sealing engagement with the inside surface of the recess, when the leaf is closed with respect to the frame, axial voids are provided between the outwardly projecting formations of the seal and the inside surface of the recess, which voids may be used for drainage of water from between the outwardly projecting formations and the inside surface of the recess.

Where at least three outwardly projecting formations are provided, at least two axial voids may be provided between adjacent pairs of the formations.

Any water passing an outermost of the outwardly projecting formations of the seal may be drained from a void between the outermost and next inner formation, via the internal hollow of the seal, there being a plurality of openings into the internal hollow from the void through which water to be drained may pass.

In one construction, the frame and the leaf may each have two opposite sides which in use are generally upright, and a top, the two opposite sides of the frame or the leaf each having a recess to receive a seal which extends along the corresponding side of the leaf or the frame respectively, and the top of the frame or the leaf having a generally two sided recess, drainage of water from voids between the outwardly projecting formations of the seals at the sides being via the channels of the recesses and drainage of water from voids between the outwardly projecting formations of the seal at the top being via an internal hollow of the seal, there being a plurality of openings into the internal hollow of the top seal from the voids through which water to be drained may pass.

Such a construction is particularly applicable where the sealing arrangement is for sealing a door relative to an aircraft fuselage.

According to a second aspect of the invention we provide an aircraft having a door which is sealed relative to the fuselage thereof by a sealing arrangement according to the first aspect of the invention.

According to a third aspect of the invention we provide a seal for a sealing arrangement, the seal being made of a generally resilient material and being of generally elongate configuration, the seal having at least three axially extending outwardly projecting formations and a generally plain surface which is adapted to be secured to a surface of the sealing arrangement, a first outwardly extending projection extending generally normally to the plain surface, and a pair of formations, one either side of the first formation, extending in opposite directions along a line generally parallel to the plain surface, the seal being generally tubular having a tube wall and axially extending internal hollow, the configuration of the hollow defined by the tube wall, conforming generally to the external configuration of the seal.

The invention will now be described with reference to the accompanying drawings in which:

BRIEF DESCRIPTION OF THE DRAWINGS

FIGS. 4a to 4g are cross sections through an alternative embodiment of a sealing arrangement for use in the invention, showing how the seal is formed as a leaf is closed with respect to a frame;

DESCRIPTION OF THE PREFERRED EMBODIMENTS

Figure 2:
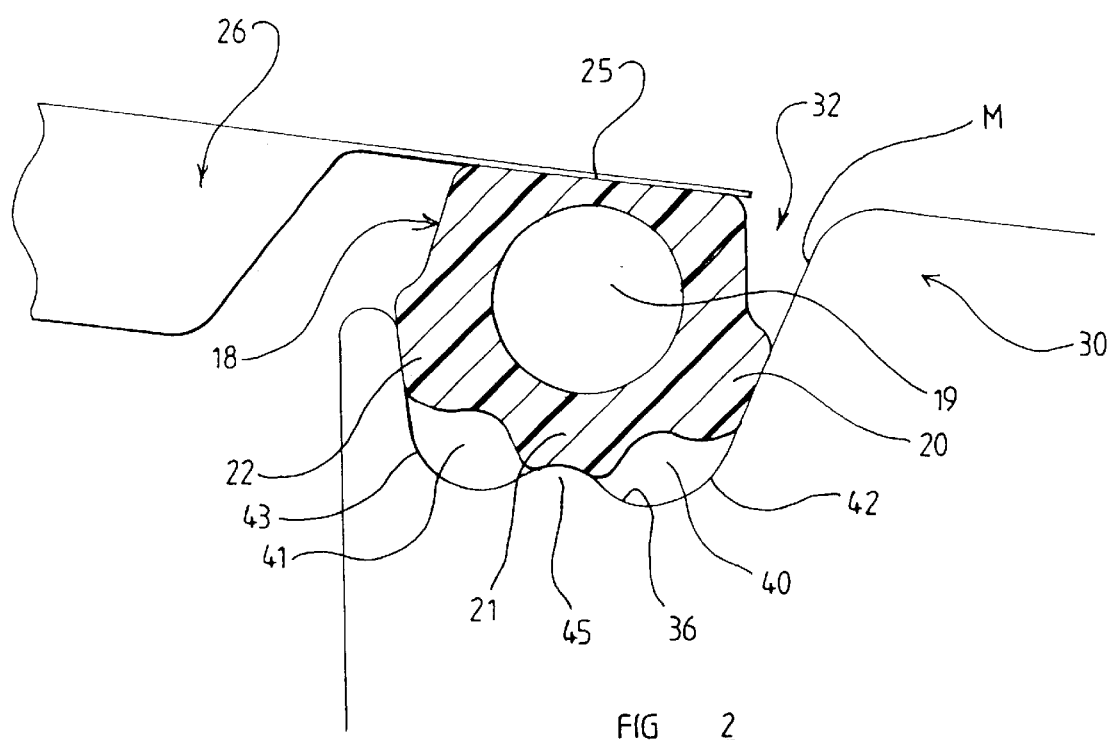
FIG. 2 is a view similar to that of FIG. 1 but showing a sealing arrangement in accordance with the invention.

Referring to FIG. 2, a sealing arrangement in accordance with the invention utilises an elongate resiliently deformable door seal 18 made of a material such as rubber or neoprene or the like.

The seal 18 has an axially extending internal hollow 19 which extends throughout the length of the seal 18, and a plurality, in this example three, axially extending outwardly projecting formations 20, 21, 22. The seal 18 further has a generally flat surface part 25 which is adhered or otherwise attached to the door 26 of the arrangement in weather-tight manner.

Such a seal 18 extends along the two opposite sides 28, 29 (see FIG. 3) of a door coaming or frame 30 of a helicopter fuselage in this example. The sides 28, 29 are generally upright in use, and a separate top seal 32 of different configuration to the side seals 18 extends across a top section 33 of the door coaming 30 as hereinafter explained.

The sides 28, 29 of the door coaming 30 each provides a generally channel shaped recess 32 a mouth of which opens towards the adjacent door 26 when the door 26 is closed in the coaming 30. When the door is closed the side seals 18 are received in their respective channel shaped recesses 32, and the outwardly projection formations 20, 21, 22 engage an inside surface 36 of the channel.

In this example, the outwardly projecting formations 20, 21, 22 are generally equally spaced. Between adjacent pairs of the formations, i.e. between an outermost formation 20 and the next inner or first formation 21, and between the inner first formation 21 and another outer formation 22, there are provided axially extending voids 40, 41. To emphasise the void volume, the inside surface 36 of the channel shaped recesses 32 includes a pair of lobes 42, 43 separated by a ridge 45 with which the inner outwardly projecting formation 21 of the seal 18 engages.

Thus there is provided between each side seal 18 and its respective channel recess, three areas of contact, thus providing a triple seal. In the event that water migrates past the outermost outwardly projecting formation 20, such water may be drained away through the void 40. In the event that the water fills the void 40, or otherwise migrates past the inner or first outwardly projecting formation 21, the water may be drained from between the coaming 30 and door 26 via the second void 41.

Thus the side seals 18 act both to deter the ingress of water, but also to drain away any water which does migrate past at least the first and/or second outwardly projecting formations 20, 21.

The side seals 18 are thus generally clover shaped in outline. It will be appreciated that by providing the width of a mouth M of the receiving channel shaped recess 32 to be slightly less than width of the side seal 18, the outwardly projecting formations 20, 21, 22 will be urged into tight engagement with the inside surface 36 of the recess 32, and the engagement of each projecting formation 20, 21, 22 with the inside surface 36 will cause the seal 18 to deform, and assist in urging the other outwardly projecting formations 20, 23 into tight engagement with the inside surface 36. Thus particularly the outermost outwardly projecting formations 20, 22 will be splayed outwardly by virtue of the three lobed clover cross sectional shape of the seal 18.

Furthermore, in the event of a positive pressure being experienced by the side seals 18 from the outside, the projecting formations 20, 21, 22 will tend to be urged into increasingly tight engagement with the inside surface 36 of the channel shaped recess 32 thus improving the seal. In the event of a negative pressure being experienced, as a result of suction forces created by aerodynamic conditions, at least the outermost second and third outwardly projecting formations 20, 22 which are splayed outwardly with respect to the general axial extent of the seal 18, will remain in sealing engagement with sides of the channel shaped recesses 32.

Figure 1:
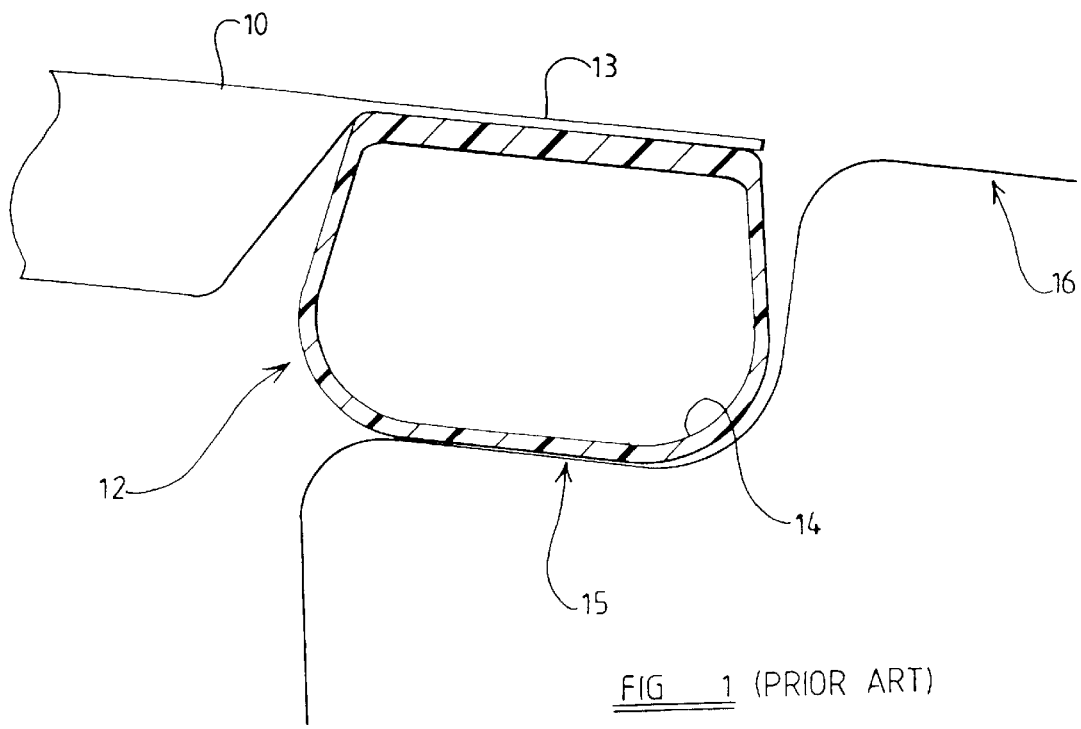
FIG. 1 is an illustrative view of a prior art sealing arrangement.

A sealing arrangement having a seal 18 as described and a channel shaped recess 32 may be provided along the top sections 33 of the coaming 30 if desired, but in some circumstances the provision of a channel shaped recess 32 for the top section 33 of the coaming 30 may be undesirable. Thus a seal 18a of similar configuration to the side seals 18 may be provided along the top section 33 of the coaming 30, but such top seal 18a may be received in a conventionally shaped two sided recess as indicated at 15 in FIG. 1. Thus only a single void 40 may be provided between the first and second outwardly projecting formations 20, 21 for the drainage of water, as the third outwardly projecting formation 22 may not engage any part of the coaming.

To improve the drainage capacity of such an arrangement, the top seal 18a may be provided with a plurality of openings 45 along its length, from the void 40 into the internal hollow 19 which may communicate with a drain.

If desired the top seal 18a need not be of a similar configuration to the side seals 18, but may otherwise be adapted to be received in the two-sided recess 15. For example, the top seal 12a may be a conventional "D" shaped seal as indicated at 12 in FIG. 1, but having a plurality of holes 45 along its length to allow fluid communication between the recess 15 and an internal hollow 19 of the seal 18a.

Other modifications are possible without departing from the scope of the invention. For example the side seals 18 need not have three outwardly projecting formations 20, 21, 22 as indicated, but may have two or more than three such formations so that a void is provided between each adjacent pair of the formations to facilitate water drainage.

Although the invention has been described in relation to a sealing arrangement for a helicopter door 26, the invention may be more generally applied to providing a sealing arrangement between a leaf and a frame. Instead of the seal being provided on the door or other leaf and a recess on the coaming or other frame, the seal may be provided on the coaming or other frame and the recess on the door or other leaf.

Figure 3:
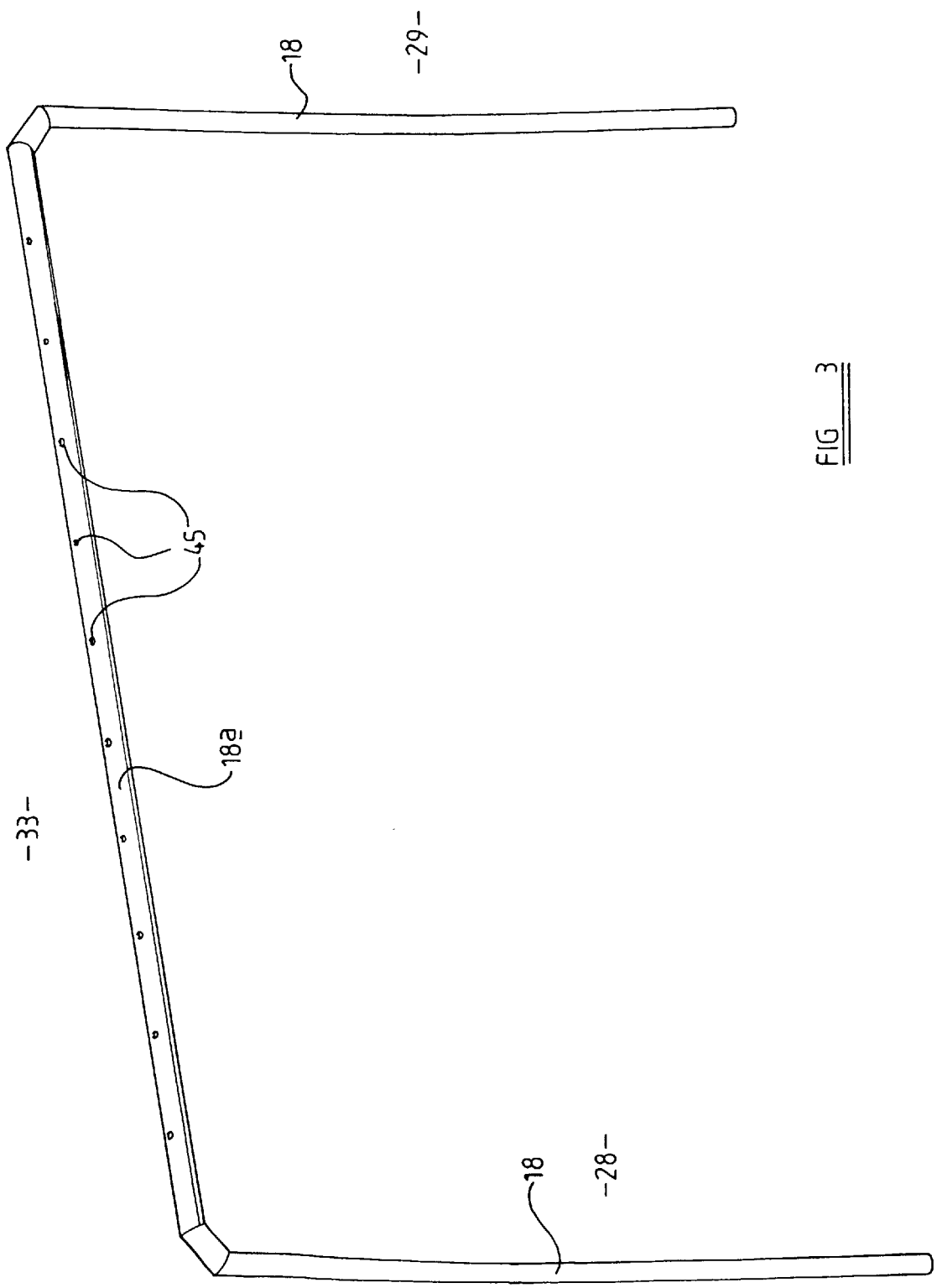
FIG. 3 is an illustrative view of a seal for use in the sealing arrangement of the invention.

Referring to FIGS. 4a to 4g, a seal 118 similar to that shown in FIGS. 2 and 3 is shown, which has three lobes 120, 121 and 122 which are provided by axially extending outwardly projecting formations of the seal 118. The seal includes an axially extending plain surface P which is secured with adhesive and/or otherwise to a generally flat surface part 125 of the leaf 110.

The seal 118 in this example is of tubular construction, as is the seal 18 of the previous example. However in FIGS. 4a to 4g, the seal has a thin tube wall W, and an internal hollow 119 of the tube, generally conforms to the external configuration of the seal 118. Again the seal 118 may be made in rubber, natural or synthetic, such as neoprene or the like.

The frame provides a channel-shaped recess 132 has a plain base 145, unlike the recess 32 of the previous embodiment where the recess has a ridge 45, and a pair of sides S1, S2, the base 145 and sides S1, S2 each providing inside surface parts for a reason hereinafter explained.

The first outwardly projecting formation 121 of the seal 118, is between the outermost pair of second and third outwardly extending formation 120, 122. The first formation 121 extends generally normally to the axially extending plain surface P of the seal, and in use (see FIG. 4g) seals and engages with the base 145 of the channel, whilst the second and third outermost formations 120, 122, extend oppositely in directions along a line generally parallel to the plain surface P. The sides S1, S2 of the channel shaped recess 132 relatively inclined such that the width of the channel 132 reduces from a mouth M' thereof towards the base 145.

Figure 4A:
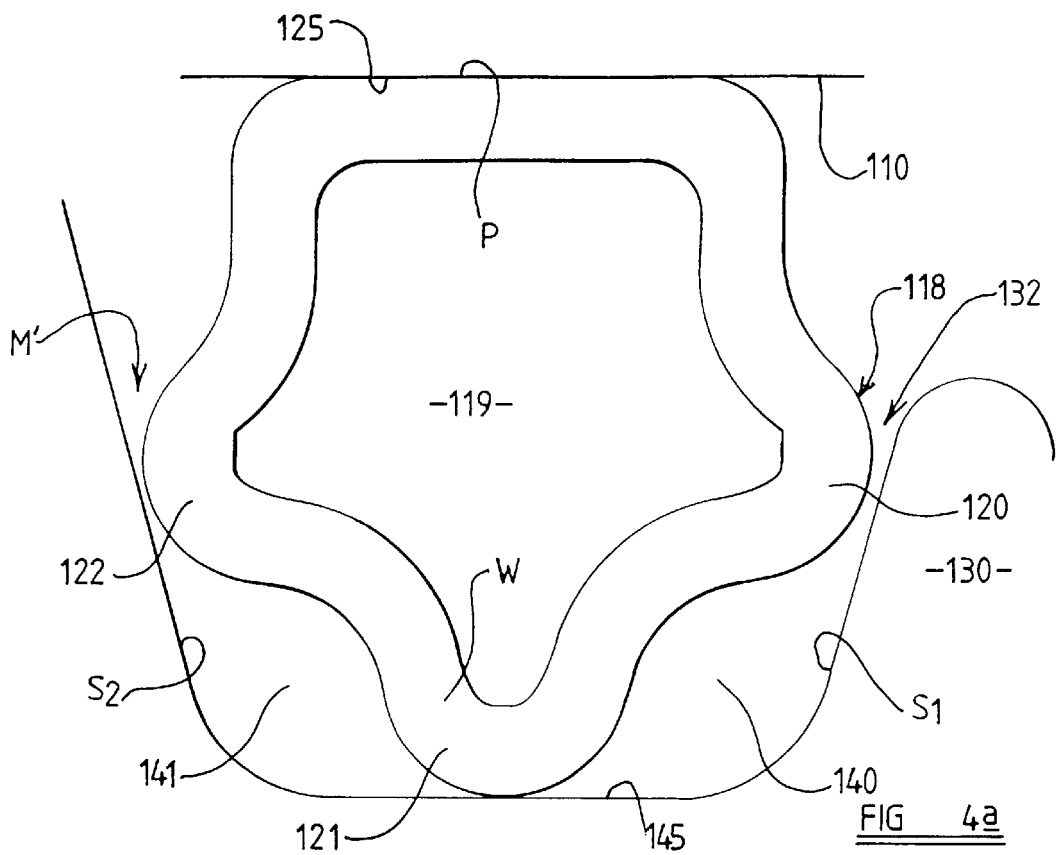

In FIG. 4a, the seal 118 is shown in a relaxed state, during closure of the leaf 10 relative to the frame 30, but prior to the seal 118 engaging the inside surface of the recess 132.

Figure 4B:
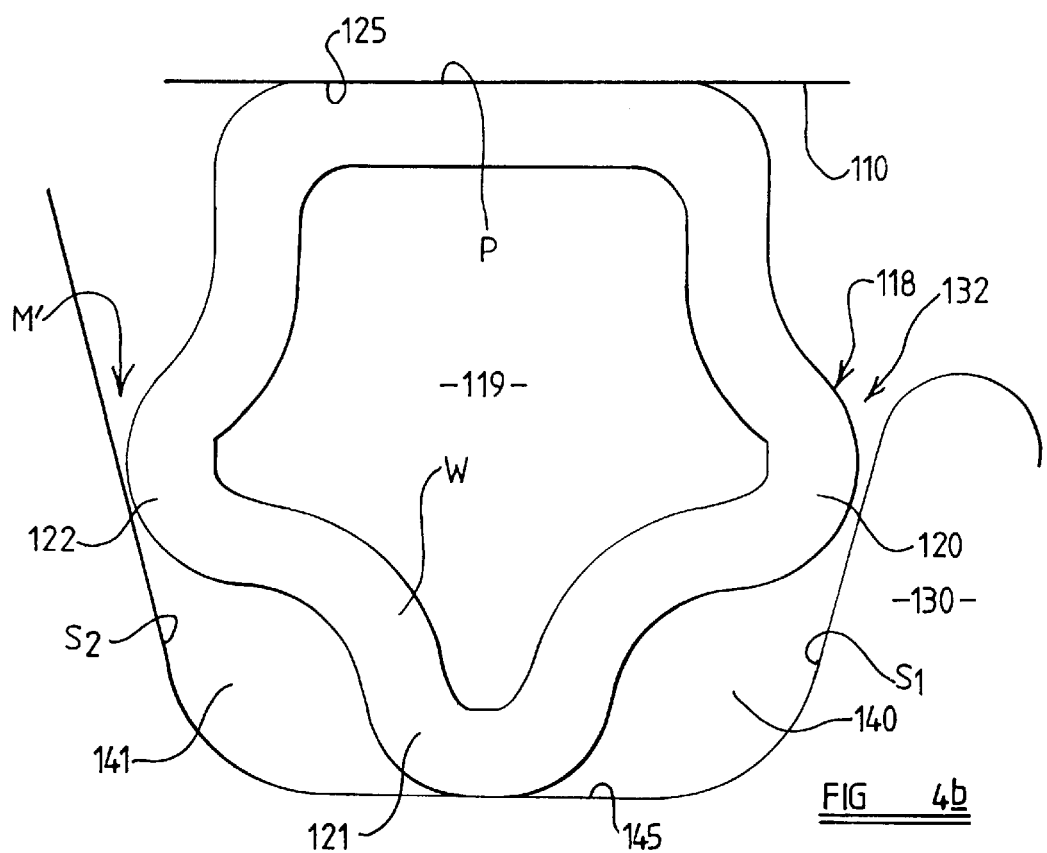
Figure 4E:
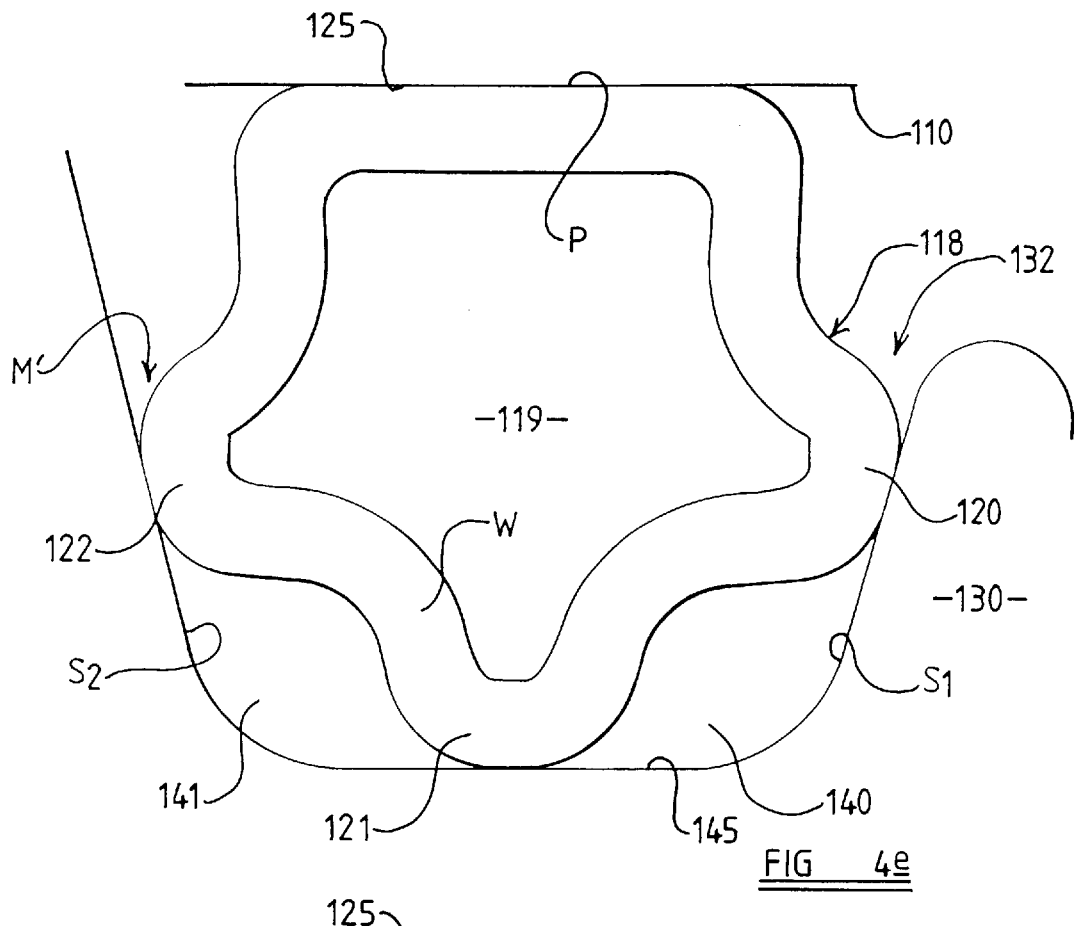
Figure 4F:
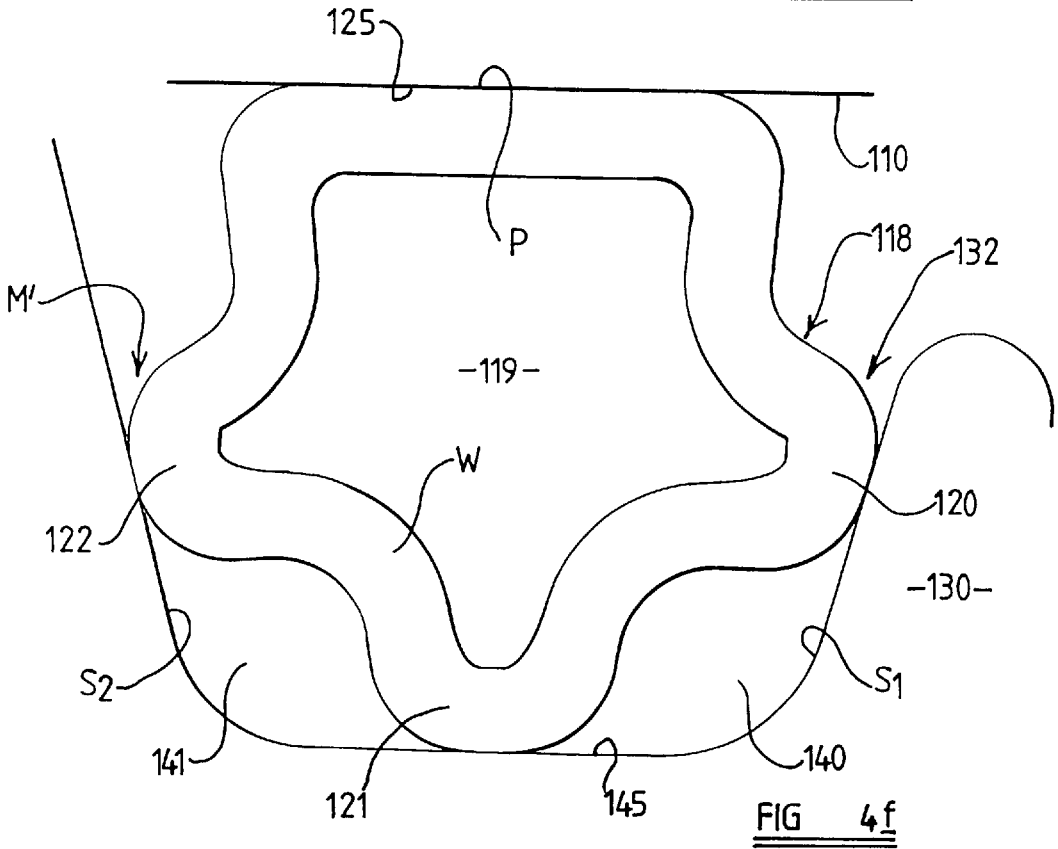

In FIG. 4b, the seal 118 is shown as the first outwardly projecting formation 121 engages with the base 145 of the channel shaped recess 132. At this point, the second and third outwardly projecting formations 120, 122 are just out of engagement with the relatively inclined sides S1, S2 of the recess 132.

Figure 4G:
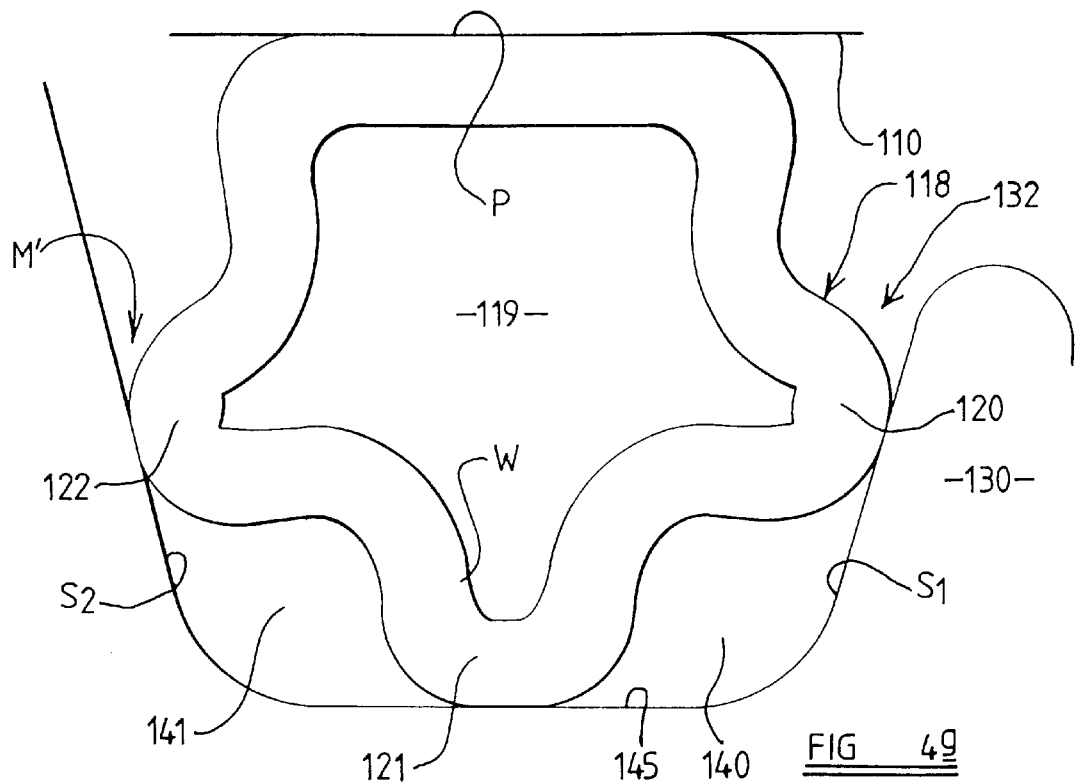
Figure 5:
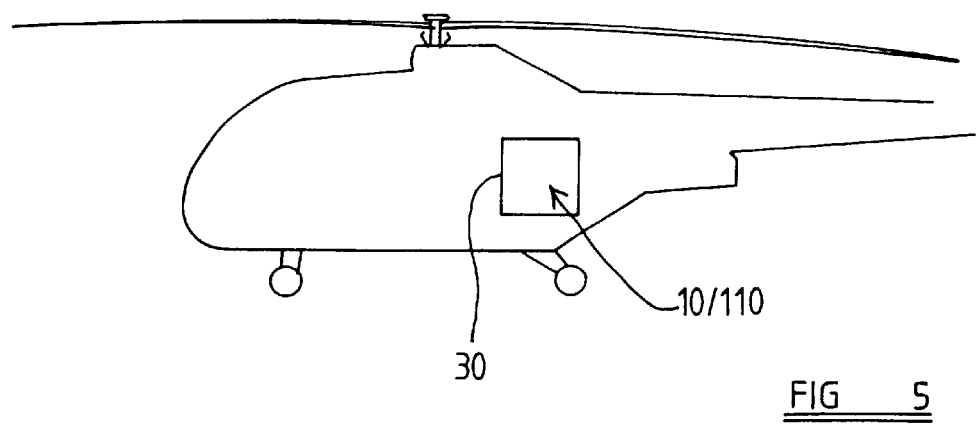
FIG. 5 is an illustrative view of an aircraft of the second aspect of the invention.

FIGS. 4c to 4g show in sequence how the seal 118 begins to deform as the leaf 110 continues to be closed and the second and third outwardly extending projection 120, 122 increasingly tightly engage the respective sides S1, S2 of the channel shaped recess 132. FIG. 4g shows the shape assumed by the seal 118 when the leaf 110 is fully closed in the frame 130.

It will be appreciated that by virtue of the three lobed thin walled construction of the seal 118, as the first outwardly extending projection 121 engages the base 145 of the channel 132, the seal 118 will deform in such a way that the second and third outwardly extending projection 120, 122 will be progressively splayed outwardly along the line parallel to the plain surface P as the leaf is closed, such as to improve the sealing effect of the projections 120, 122 with the sides S1, S2 of the channel 132, which sealing effect is assisted by virtue of the width of the channel 132 decreasing from the mouth M' to the base 145. Thus the seal 118 and recess 130 together operate to achieve most efficient sealing.

When the leaf 110 is closed with respect to the frame 130, voids 140, 141 between adjacent pairs of the projecting formations 120, 121, 122 may be formed, which may be used for drainage purposes as described above in relation to the first embodiment.

An advantage of the second embodiment described with reference to FIGS. 4a to 4g compared with the first described embodiment, is that by virtue of the tube wall W of the seal 118 being thin (and of generally constant thickness throughout), the seal 118 may be deformed relatively easily as the leaf 110 is closed with respect to the frame 130, such that efficient sealing may be achieved, without undue force being required to close the leaf 110 against the seal 118, which could result in damage e.g. buckling of the door of an aircraft, which is not primarily designed to withstand strong closure forces.

Thus, compared with prior art proposals, a low force is required to close the leaf 110, whilst providing an improved seal.

The seal 118 and frame 130 of the FIGS. 4a to 4g embodiment may be used in the manner of the side seals 18 and/or the top seal 18a as shown in FIG. 2.

In all of the embodiments described, instead of the seal 18, 118 being secured relative to a leaf 10, 110 of the arrangement, and the respective recesses 32, 132 to the frame 30, 130, if desired the seals 18, 118 may be provided on the frame 30, 130 and the recesses 32, 132 on the leafs 10, 110 as desired.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A sealing arrangement between an opening leaf and a frame of an aircraft door, one of the frame and leaf providing an elongate generally channel-shaped recess including an inside surface having a base part and side parts, and a mouth which opens to the leaf or frame part, respectively, when the leaf is closed, and the other of the leaf and frame carrying a deformable elongate seal which, when the leaf is closed with respect to the frame, is received in the channel-shaped recess, wherein the elongate seal includes a plurality of axially extending outwardly projecting lobe formations, and an internal hollow, the recess and the seal being configured such that as the leaf is closed and the seal is received in the recess, a first of the axially extending outwardly projecting lobe formations of the seal engages with the base part of the inside surface of the recess and as the leaf is continued to be closed, the seal becomes deformed in a manner to cause the or at least one of the other axially extending outwardly projecting formations to be urged into sealing engagement with a side part of the inside surface of the channel-shaped recess.

2. A sealing arrangement according to claim 1 wherein the seal is of a generally tubular construction having an internal axially extending hollow defined by a tube wall, the hollow in cross section, generally conforming to the external configuration of the seal.

3. A sealing arrangement according to claim 2 wherein the tube wall is shaped to conform generally to the external configuration of the seal, the tube wall and hence the configuration of the internal hollow deforming as the leaf is closed with respect to the frame.

4. A sealing arrangement according to claim 1 wherein the seal includes at least three axially extending outwardly projecting lobe formations each arranged to engage with a respective part of the inside surface of the recess as the leaf is closed with respect to the frame, the first axially extending lobe formation being located intermediate a pair of other axially extending lobe formations, and the first axially extending formation engaging with the base part of the inside surface of the recess thus to cause deformation of the seal as the leaf is continued to be closed, such as to urge the pair of other axially extending lobe formations mutually away from one another into sealing engagement with respective parts of the inside surface of the recess.

5. A sealing arrangement according to claim 4 wherein the seal is of a generally tubular construction having the internal axially extending hollow defined by a tube wall, the seal having an axially extending generally flat surface part by means of which the seal is attached to the leaf or the frame, with the first outwardly projecting lobe formation extending generally normally to the flat surface part, and other outwardly projecting formations being located on either side of the first formation, and extending outwardly along a line which is generally parallel with the generally flat surface part.

6. A sealing arrangement according to claim 1 wherein the elongate recess of one of the leaf and frame, is generally channel shaped and has a mouth which, when the leaf is closed in the frame, faces the other of the frame and the leaf respectively, with the outwardly projecting lobe formations of the seal each being in sealing engagement with the inside surface of the channel when the leaf is closed with respect to the frame.

7. A sealing arrangement according to claim 6 wherein the first inside surface part of the channel with which the first axially extending outwardly projecting formation engages as the leaf is closed with respect to the frame, is at a base of the channel, the other axially extending outwardly projecting formations being urged as the seal deforms, into sealing engagement with respective inside surface parts which are provided at sides of the channel.

8. A sealing arrangement according to claim 1 wherein when the leaf is closed with respect to the frame, axial voids are provided between the outwardly projecting lobe formations of the seal and the inside surface of the recess, to permit drainage of water from between the outwardly projecting formations and the inside surface of the recess.

9. A sealing arrangement according to claim 8 wherein at least three outwardly projecting lobe formations provide at least two axial voids between adjacent pairs of the formations.

10. A sealing arrangement according to claim 8 wherein the seal is of a generally tubular construction having an internal axially extending hollow defined by a tube wall, the hollow in cross section, generally conforming to the external configuration of the seal and wherein any water passing an outermost of the outwardly projecting lobe formations of the seal is drained from a void between the outermost and next inner lobe formation, via the internal hollow of the seal, there being a plurality of openings into the internal hollow from the void through which water to be drained may pass.

11. A sealing arrangement according to claim 8 wherein the frame and the leaf each have two opposite sides which in use are generally upright, and a top, the two opposite sides of the frame or the leaf each having a recess to receive the seal which extends along the corresponding side of the leaf or the frame respectively, and the top of the frame or the leaf having a generally two sided recess, drainage of water from voids between the outwardly projecting lobe formations of the seal at the sides being via the channels of the recess and drainage of water from voids between the outwardly projecting formations of the seal at the top being via an internal hollow of the seal, there being a plurality of openings into the internal hollow of the top seal from the voids through which water to be drained may pass.

12. A sealing arrangement according to claim 1 which is for sealing a door relative to an aircraft fuselage.

13. An aircraft having a door which is sealed relative to the fuselage thereof by a sealing arrangement between an opening leaf and a frame of the aircraft door, one of the frame and leaf providing an elongate generally channel-shaped recess including an inside surface having a base part and side parts, and a mouth which opens to the leaf or frame part, respectively, when the leaf is closed, and the other of the leaf and frame carrying a deformable elongate seal which, when the leaf is closed with respect to the frame, is received in the channel-shaped recess, wherein the elongate seal includes a plurality of axially extending outwardly projecting lobe formations, and an internal hollow, the recess and the seal being configured such that as the leaf is closed and the seal is received in the recess, a first of the axially extending outwardly projecting lobe formations of the seal engages with the base part of the inside surface of the recess and as the leaf is continued to be closed, the seal becomes deformed in a manner to cause the or at least one of the other axially extending outwardly projecting lobe formations to be urged into sealing engagement with a side part of the inside surface of the channel-shaped recess.

14. A sealing arrangement between an opening leaf and a frame of an aircraft door, one of the frame and leaf providing an elongate generally channel-shaped recess including an inside surface having a base part and side parts, and a mouth which opens to the leaf or frame part, respectively, when the leaf is closed, and the other of the leaf and frame carrying a deformable elongate seal which, when the leaf is closed with respect to the frame, is received in the channel-shaped recess, wherein the elongate seal includes a plurality of axially extending outwardly projecting lobe formations, and an internal hollow, the recess and the seal being configured such that as the leaf is closed and the seal is received in the recess, a first of the axially extending outwardly projecting lobe formations of the seal engages with the base part of the inside surface of the recess and as the leaf is continued to be closed, the seal becomes deformed in a manner to cause the or at least one of the other axially extending outwardly projecting formations to be urged into sealing engagement with a side part of the inside surface of the channel-shaped recess, the seal, when received in the recess, surrounds the door sides and top, with the seal portion across the top of the door having a plurality of holes therethrough from its outer periphery to the inner hollow to allow fluid communication between the recess and the inner hollow of the seal to facilitate water drainage.

* * * * *